Figure 1:
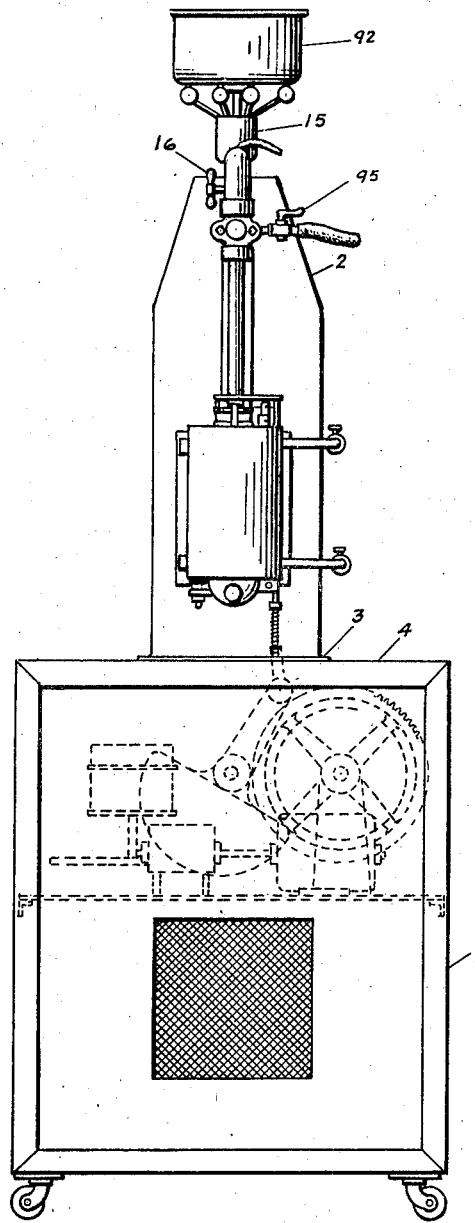

Jan. 4, 1938.  J. P. KEMP  2,104,260
REFRIGERATION APPARATUS
Filed Jan. 5, 1935    5 Sheets-Sheet 1

INVENTOR.
Jabez P. Kemp
BY
William W. Varney
ATTORNEY.

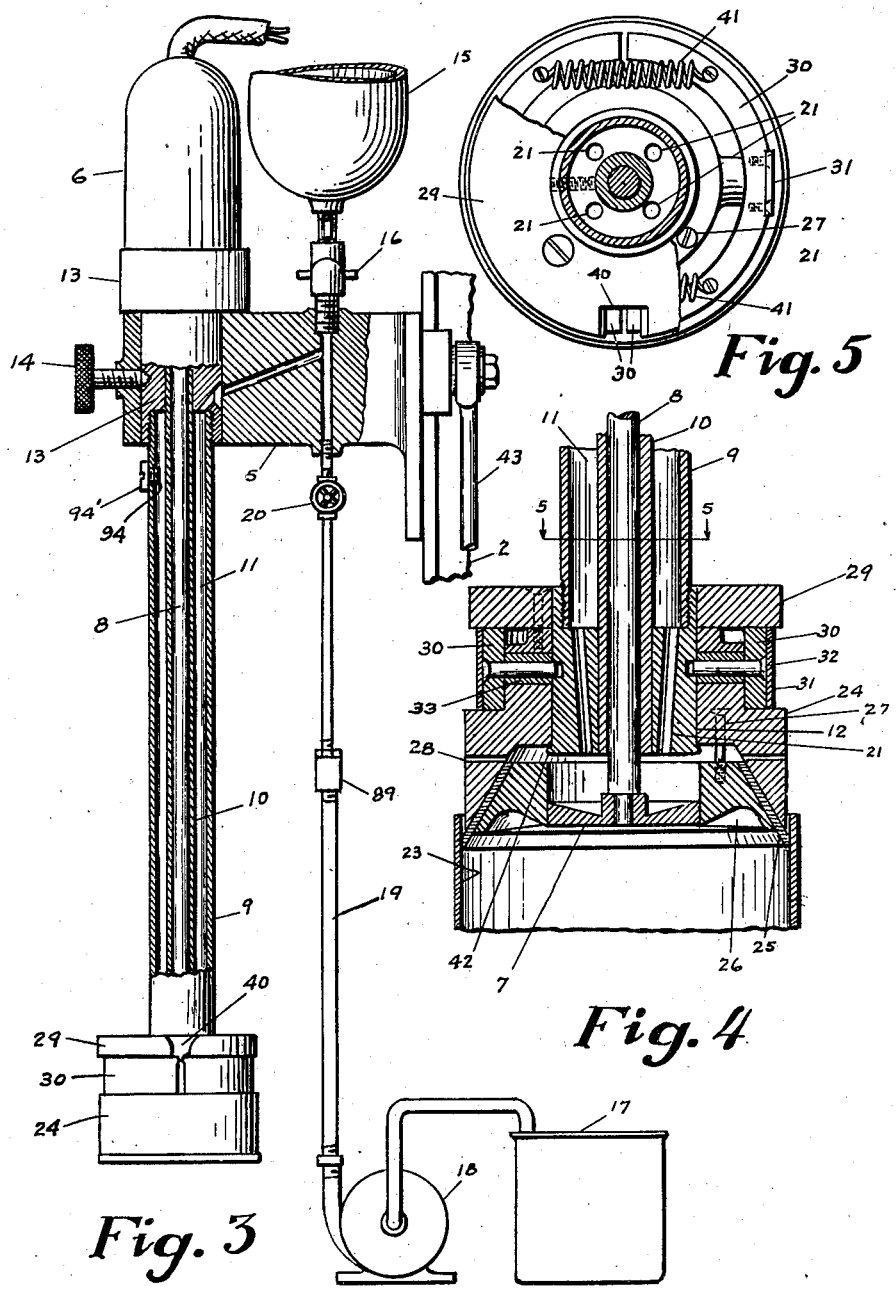

Jan. 4, 1938.   J. P. KEMP   2,104,260
REFRIGERATION APPARATUS
Filed Jan. 5, 1935   5 Sheets-Sheet 3
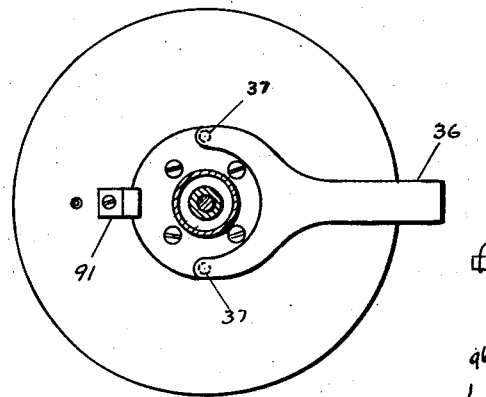
Fig. 9
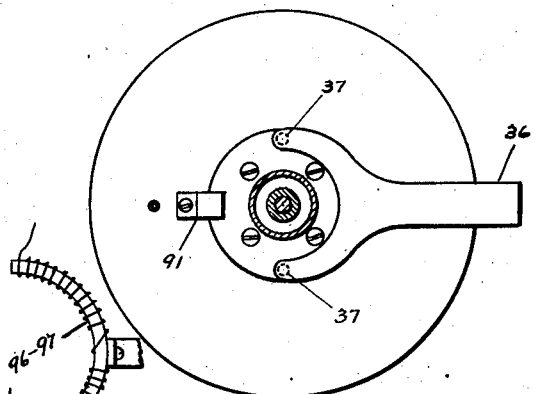
Fig. 8
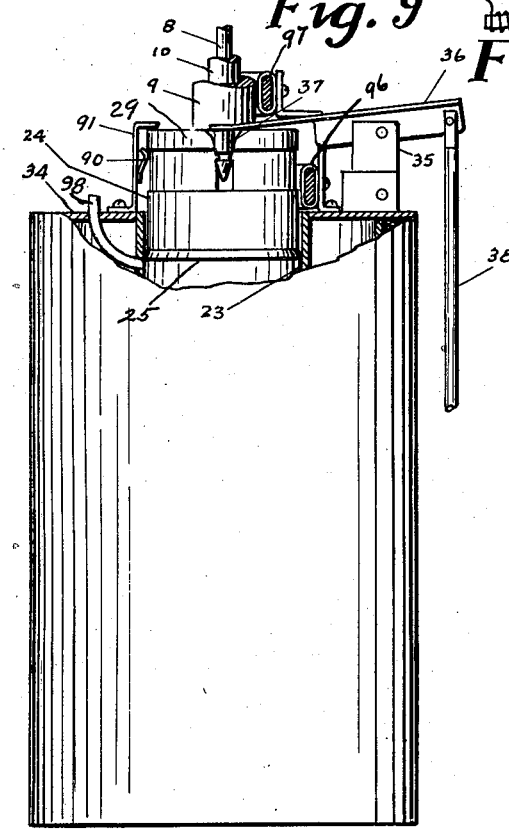
Fig. 6
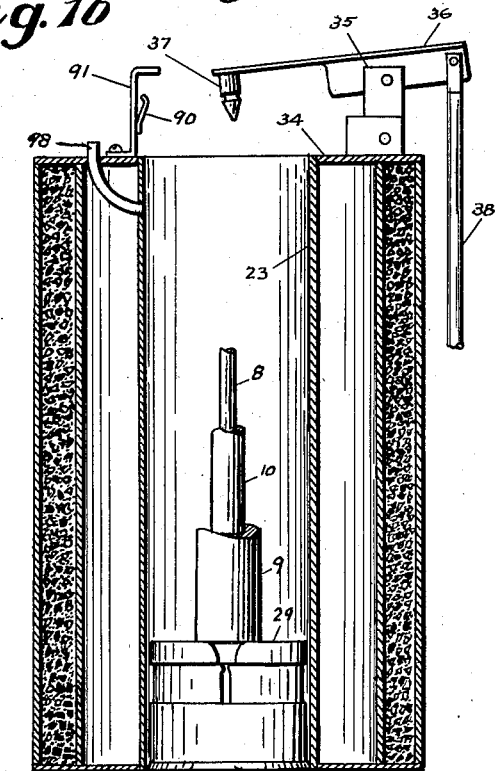
Fig. 7
Fig. 16
INVENTOR.
Jaby P. Kemp
BY William W. Varney
ATTORNEY.

Jan. 4, 1938.  J. P. KEMP  2,104,260
REFRIGERATION APPARATUS
Filed Jan. 5, 1935   5 Sheets-Sheet 4
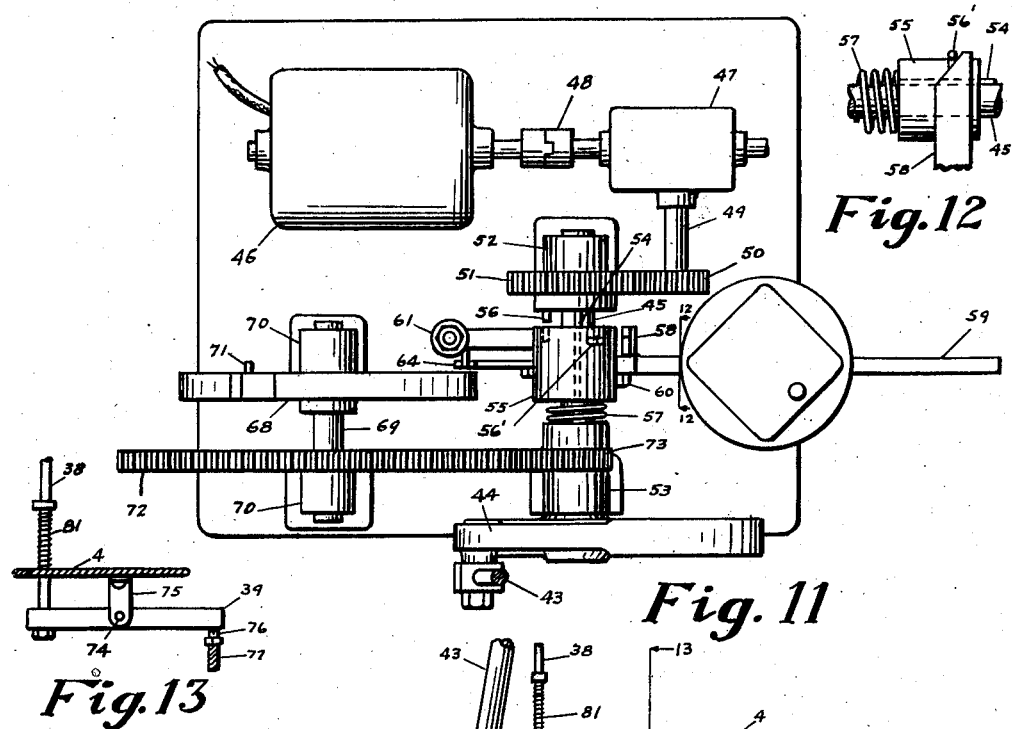
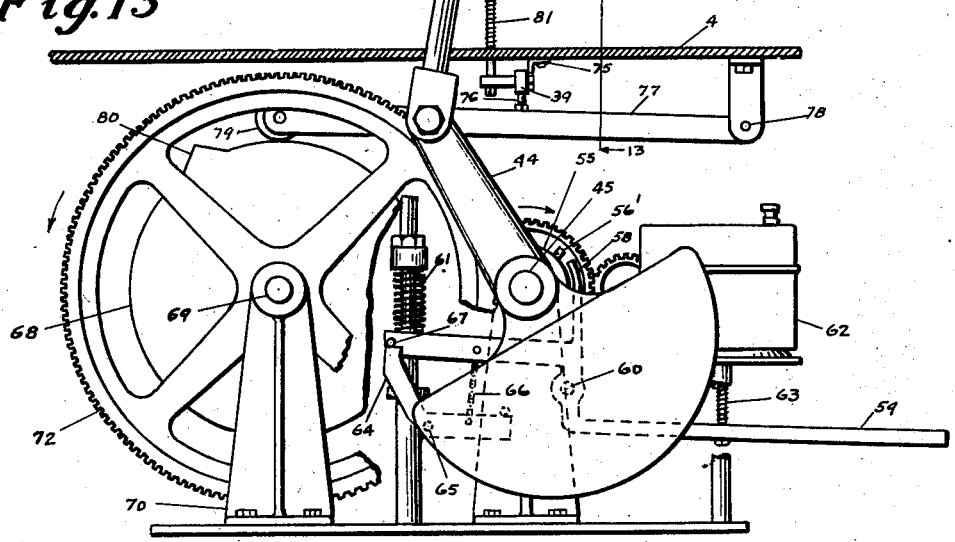
INVENTOR.
Jabez P Kemp
BY
William W. Varney
ATTORNEY.

Jan. 4, 1938.   J. P. KEMP   2,104,260
REFRIGERATION APPARATUS
Filed Jan. 5, 1935   5 Sheets-Sheet 5
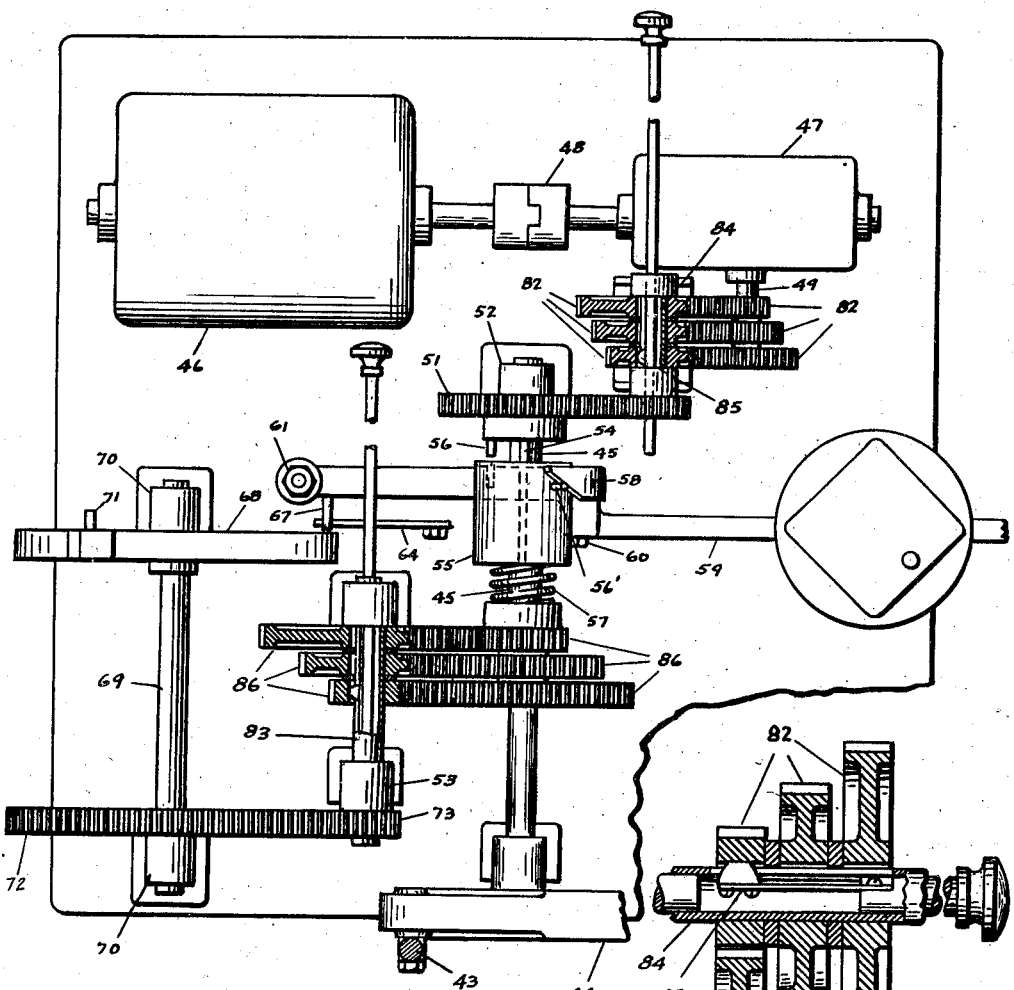
Fig. 14
Fig. 15
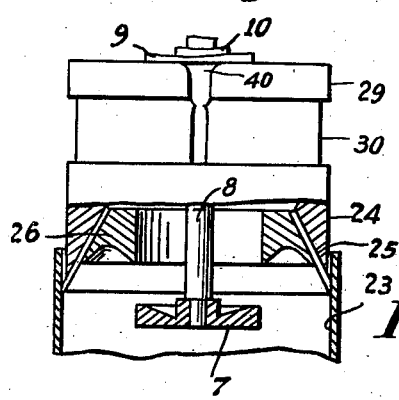
Fig. 17
INVENTOR.
BY Jabez P. Kemp
William W. Varney
ATTORNEY.

Patented Jan. 4, 1938

2,104,260

UNITED STATES PATENT OFFICE 2,104,260

REFRIGERATION APPARATUS

Jabez P. Kemp, Baltimore, Md.

Application January 5, 1935, Serial No. 506

7 Claims. (Cl. 62—114)

The object of my invention is an improved atomizer of the centrifugal type, provided with spraying and scraping means, and improved means for combining the same.

A further object of my invention is the providing in an atomizer means for continuous operation of the spraying means while the scraping means is automatically controlled in its operation of periodical scraping.

A further object of my invention is the providing in an atomizing machine means for varying the automatic timing between the scraping and spraying means while the machine is running.

A further object of my invention is the providing of means for varying the speed of the spraying with respect to the surface being sprayed while the machine is in operation.

A further object of my invention is the providing of means for varying the speed of the spraying with respect to the surface being sprayed while the machine is in operation, and varying the automatic timing of the scraping means with reference to the spraying means.

A further object of my invention is an improved process for the separation of combined materials by centrifugal action, then collecting one of the separated materials from a depositing surface upon which it may be deposited in the operation.

A further object of my invention is the providing in an atomizer provided with a spraying and scraping means, improved means for operating the scraping means to prevent a back flow of fluids behind said scraping means.

A further object of my invention is an improved means provided in a refrigeration apparatus for cleaning the same, a highly important feature for sanitary purposes.

With the foregoing and other objects in view, my invention consists of the methods employed, combination and arrangement of systems, elements, apparatus and means as hereinafter specifically set forth, provided and illustrated in the accompanying drawings, wherein is shown the preferred embodiment of my improved apparatus for practicing my improved processes; but it is understood that changes, variations and modifications may be resorted to which come within the scope of the claims hereunto appended.

My machine is particularly adapted for making ice cream and ices, where refrigeration is required, and for the spraying of oils and chemicals for emulsions, cold-creams and other broken up mixtures, where refrigeration is required. Before describing in detail the process and apparatus, I think it might be helpful to describe the operation of my machine.

I will first describe the making of ice-cream, and then refer to the modifications and adjustments required for water ice, frozen fruits, and the like.

In making ice-cream mixtures in my improved machine, the mixture is sprayed with a rotary sprayer onto a chilled surface inside a chilled chamber, by moving the revolving sprayer relatively to the chilled chamber as often as necessary at a proper rate of speed to give a sufficient coating of a quality of fineness desired; this is regulated by the speed of the machine, as well as by the speed of the spraying. When a sufficient layer is formed on the chilled surface, the scraper acts to scrape the frozen mixture into a receptacle. This has been done before, and my invention consists of improved means for doing the same over the ways previously attempted, as to ice-cream and ices.

Heretofore, considerable manual adjustments, manual starting and stopping of the various parts had to be resorted to, which difficulties have been overcome in my machine.

My apparatus is also useful in the separation of fats and oils, such as lard, separating the lard-oil from the stearine.

In the making of emulsions of certain pharmaceutical preparations, it is often desirable to throw the mixed mass on to a wall for aggregating and mixing purposes, and thereafter scrape from said wall the masses thus deposited.

Figure 2:
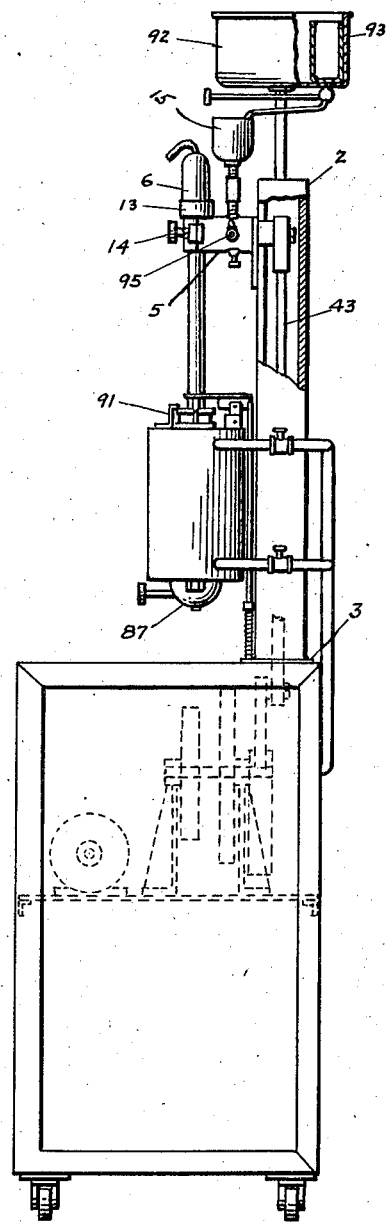

In the drawings of the herein-described embodiment of my invention, Figure 1 is a front view in elevation of my improved apparatus designed particularly for the making of frozen products; Fig. 2 being a side view in elevation of the apparatus shown in Fig. 1; Fig. 3 is an enlarged view in elevation, partly in section, of the spraying device, including the scraping head and the feeding mechanism for the same; Fig. 4 is an enlarged view of the scraper and impeller, showing where the rotor 7 is in housed position when the scraping takes place; Fig. 5 is a sectional view, looking down on the apparatus shown in Fig. 4, and particularly shows a part of the means for attaching and detaching the scraping and spraying appliances together; Fig. 6 is an enlarged view in elevation of the receiver; as shown, it is a receiver for receiving the sprayed material against a temperature-controlled surface, shown partly broken away; Fig. 7 is a sectional view of the receiver shown in Fig. 6, particularly showing the temperature control chamber, the insulation and the spraying chamber.

Fig. 8 shows a plan view, looking down on Fig. 7; Fig. 9 is a plan view, looking down on Fig. 6; Fig. 10 is a side view in elevation of the driving and timing mechanism contained in the base of the machine, as shown in dotted outline in Figs. 1 and 2; Fig. 11 is a plan view of the appliance shown in Fig. 10; Fig. 12 is a side view in elevation of the drive clutch member 55 and cam 58; Fig. 13 is a sectional view in side elevation, taken through 13—13 of Fig. 10, looking in the direction of the arrows; Fig. 14 is a view somewhat similar to Fig. 11, showing a modified form of the driving and timing mechanism, showing one form of cluster gearing for obtaining different speeds. In this case the individual gears of the intermediate cone of gears are engaged with the shaft on which they are mounted by means of a drive key controlled by a pull-rod manually operated, well-known in metal working machinery; Fig. 15 is an enlarged sectional view of the cluster gears and drive key mechanism, shown in Fig. 14, and Fig. 16 is a view of an electric heater provided to heat the scraping device and the spray header, which heater is shown in position in Fig. 6 at two places, at 96 and/or 97, the heater being constructed practically the same in both cases.

Fig. 17 shows the position of the rotor 7 with reference to the scraper when scraping occurs, thus permitting the rotor to operate continuously spraying against the surface 23. This view shows a modified form of the apparatus wherein the rotor is permitted to continuously operate and is useful in the mixing or separating of materials as may be desired.

Similar numerals refer to similar parts throughout the several views.

1 is the cabinet, forming the base of my apparatus, and in which the timing and operating mechanism for the spraying and scraping devices are partly placed in the upper part, and the refrigerating and temperature generating mechanism in the lower part. 2 is the hollow upright frame member, preferably formed of two parts, front and back, secured together by any ordinary means, such as screws. This member forms a housing for the connecting-rod 43 attached to cross-head 5, which is also supported in guideway in the housing, and which cross-head carries the spraying and scraping mechanism, said housing being provided with flanges 3 for resting upon the top plate 4 of the cabinet. Connecting-rod 43 reciprocates the spraying mechanism relatively to surface 23, which is the receiver for the material being sprayed, and when this spraying mechanism is attached to the scraping mechanism surface 23 is cleared of the material sprayed thereon.

6 is the driving motor for the rotor 7, which rotor is driven by means of shaft 8 by motor 6 (see Figs. 3 and 4). I would state here that any driving means other than electrical may be resorted to, if desired; as shown, 6 is an electric motor, but a belt and pulley would answer the same purpose. 9 is the feed tube within which is shaft tube 10. Feed tube 9, with its container shaft tube 10, forms a feed chamber 11 between the two through which the material to be sprayed passes. Within shaft tube 10 is shaft 8, said tube acting as a loose bearing for the same, preventing a whipping of the shaft. Tubes 9 and 10 at the lower ends are secured to lower tube header 12, tube 9 being screwed to the tube header 12, and tube 10 by entering the same by a snug fit and may be secured by a set screw not shown; and at the other end they are secured to upper tube header 13, tube 9 by screwing into the same and tube 10 by a loose fit, to facilitate dis-assembly for cleaning purposes. Upper tube header 13 is secured to carrying member 5 by means of a split bearing construction, and is kept from turning or moving lengthwise by means of set screw 14. This split bearing construction is adapted to obtain quick dis-assembly for cleaning purposes (see Fig. 2). Motor 6 is supported by upper tube header 13.

15 is a charge feed-cup for supplying ingredients to be sprayed, and is used when gravity feed is employed. Charge feeding cup 15 connects with feed chamber 11 through valve 16, which valve 16 is used to control the flow of the ingredients, and is closed when pressure feed is resorted to. 17 is a supply reservoir, 18 is a pressure pump, 19 is a telescopic tubular connection provided with stuffing-box and gland 89 to accommodate the reciprocation of the various moving parts, and 20 is a valve controlling the feed from reservoir 17, and is closed when gravity feed is resorted to.

From feed chamber 11 (see Figs. 3, 4, and 5), the material is fed through passages 21 in lower tube header 12, and flows upon the impeller 7 near the central portion thereof, and is thrown outwardly thereby against the surface to be sprayed 23 (see Figs. 6 and 7).

I might state here (see Fig. 6), that when the impeller 7 is spraying it is not in the position shown in Fig. 4, the scraper being held in the position shown in Fig. 6, the impeller and accompanying feed tubes 21 moving up and down, spraying the surface independent of the scraper. In this connection, when the term "up-and-down" is used, it is meant relatively in connection with the scraper, and not literally, with reference to gravity.

24 is the scraper body for carrying the scraper blade 25. In this particular machine for frozen products, blade 25 is preferably made of celluloid or similar organic material to prevent a sticking or freezing of the product thereto. Celluloid has been found to be satisfactory. For other than freezing purposes, suitable plates may be used, depending upon the materials operated upon.

26 is the scraper blade keeper and is secured in place to scraper body 24 by means of screws 27. At the apex of scraper blade 25 are vents 28. Impeller 7 works loosely in keeper 26, without contacting, and when the scraping device is secured to lower tube header 12 and travels down with the impeller, there is a tendency towards a back pressure through passages 21, this being particularly so when the cup 87 is in place at the bottom of the cylinder to receive the frozen products. To relieve this back pressure vents 28, see Fig. 4, are provided, this being an important feature to prevent a sputtering of products from feed cup 15 by means of the back pressure forcing the products back through feed chamber 11.

Referring to Figs. 4 and 5, I will describe particularly the mechanism securing the spraying and scraping devices together for operative purposes when the scraping is to occur after the spraying is finished.

29 is the cover plate secured to scraper body 24 and encloses clutch jaws 30. 31 is the pin cover for covering and maintaining pins 32 in position, these pins being secured in clutch jaws 30, the pins being tapered at one end for holding purposes. 33 is a hardened bushing through which pins 32 work, and is secured in scraper body 24, acting as a slide bearing for pins 32. When the clutch jaws 30 are in closed position, pins 32 project as shown in Fig. 4 in a recess in lower tube header 12, thus locking the various parts as a unit.

34 is a top annular cylinder-head on which is secured bracket 35 in which operates clutch lever 36. Clutch lever 36 is forked at one end, the ends of the fork being provided with clutch opening pins 37, the other end of lever 36 being pivoted to trip rod 38 (see Figs. 6 and 7), which rod is operated by lever 39 in the operating mechanism (see Fig. 10).

Referring again to Fig. 5, 40 are diametrically opposed openings in cover plate 29, through which openings pins 37 neatly operate, the said openings acting as guides for maintaining uniform movement of the clutch jaws when opened by the depression of pins 37, which are tapered for this purpose. 41 are springs, as shown, two are employed, one on either side, and the ends of which are secured to the clutch jaws 30 as shown in closed or engaging position. These clutch jaws 30 freely operate between cover plate 29 and scraper body 24. Lower tube header 12 has a projection or flange 42 on its lower end which engages under scraper body 24 and acts to lift said body and attached scraper body mechanism on the return stroke of lower tube header 12, the pins 32 operating to push the scraper when the lower tube header operates in the opposite direction.

In operation, when it is desired to scrape with scraper 25, clutch jaws 30 are in closed position as shown in Fig. 4, thus locking the scraper body 24 and lower tube header 12 together. When pins 37 are introduced between clutch jaws 30, as shown in Fig. 6, disengagement occurs and scraper body 24 is released from lower tube header 12, thus permitting the spraying device to move freely with reference to the scraping device.

Scraper body 24 and attached mechanism are held in inoperative position by means of spring catch 90 secured to upright 91 (see Fig. 6), which upright is secured to annular cylinder head 34, said catch engaging under cover plate 29 (see Figs. 4 and 6).

The construction of a machine for carrying out this invention has been specifically shown, but applicant does not wish to be limited to the exact construction shown, as modifications may be resorted to for accomplishing the locking of these members, and which is claimed broadly.

Referring to Figs. 10 and 11, 43 is a connecting-rod operating carrying member 5 by being journalled thereto; the other end of connecting-rod 43 is journalled to crank 44, which crank is secured to drive shaft 45. 46 is the driving motor which drives gear reduction unit 47 through coupling 48. Gear reduction unit 47 has a reducing driving shaft 49 on which is pinion 50, said pinion driving gear 51. Gear 51 is loosely journalled on shaft 45, which shaft operates in bearings 52 and 53; gear 51 operates against bearing 52, thus being retained in relative position on shaft 45 on one side, and on the other side it operates against the end of key, or feather, 54 in shaft 45, over which key clutch member 55 operates.

In the face of the hub of gear 51 is clutch pin 56, which pin engages clutch member 55 when in closed position. Clutch member 55 operates longitudinally on shaft 45 on key, or feather 54 and is maintained in engaged position with pin 56 by spring 57 when not engaged by cam 58 by means of pin 56$^1$ riding on the tapered face of cam 58 on lever 59. Cam 58 is inclined to engage member 55 when lever 59 is up by means of said pin 56$^1$, thereby throwing clutch member 55 against compression spring 57 away from gear 51, disengaging the same, cam 58 being tapered as suggested to engage pin 56$^1$ when in contact. Cam 58, as will be seen from Figs. 10 and 11, is on lever 59, said lever being fulcrumed at 60. Lever 59 is maintained normally in up position by means of spring 61, and push switch 62 is maintained open and the motor 6 is thus rendered inoperative for the rotor or sprayer 7. In the disengagement or downward position of lever 59, as shown in Fig. 10 the switch 62 is closed, thus energizing motor 6, said switch 62 being operated by push rod 63.

Lever 59 is pushed down manually as a starting lever, and automatic means is provided for its release at the proper timing of the cycle of operation. This is accomplished by means of trip lever 64 which is fulcrumed at 65 and is provided with spring 66, which spring tends to maintain trip lever 64 in operative or closed position as shown in Fig. 10. 67 is a pin in lever 59 under which trip lever 64 is positioned when the machine is operating, and functions as a prop to maintain lever 59 against the spring 61.

68 is a disc secured to shaft 69, which shaft is journalled in bearings 70. In the face of disc 68 is trip pin 71 which engages lever 64 to push it out from under pin 67 in lever 59, thus releasing said lever. Shaft 69 is driven by gear 72, which gear is driven by pinion 73, said pinion being secured to shaft 45 and driven thereby.

The timing of trip pin 71 with reference to its action on trip lever 64 is such that it trips the lever just after pin 56$^1$ has passed the top of cam 58, so that almost a complete revolution of shaft 45 necessarily occurs before clutch member 55 moves out of engaged position with gear 51, the object of this movement being to stop the motor 6 operating the spraying mechanism at about the time the scraping operation begins and to complete the scraping operation. This latter requirement is not involved in the modified form shown in Fig. 17 where the spraying is continuous, in which case switch 62 would be unnecessary and the motor 6 would be controlled by the same current control as motor 46. Likewise, lever 59 and its attached mechanism for operation would be omitted, and the starting and stopping would be controlled by means of the main switch.

Referring to Figs. 10 and 13, trip rod 38, which is operated by lever 39, operates lever 36 as shown in Fig. 7. Lever 39 is fulcrumed at 74 on bracket 75. The opposite end of lever 39 carries an adjusting screw 76 bearing on the top of lever 77, which lever is fulcrumed at one end at 78 and at the other end is provided with roller 79, which roller is engaged by cam 80 on disc 68, thus timing the operation of the clutch lever 36 (see Figs. 6 and 7). Trip rod 38 is provided with spring 81 tending to keep adjusting screw 76 engaged with lever 77.

Referring to Figs. 1 and 2, 92 is a reservoir containing the supply. In this reservoir 92 are mixture or flavoring cups 93. Reservoir 92 is independently piped to charge feed cup 15; likewise, the various mixture flavoring cups 93 are separately piped to charge feed cup 15, and each of these are provided with valves for control so that the charge from reservoir 92 and from the flavoring cups 93 may be mixed as desired in charge feed cup 15.

To facilitate the cleaning of my apparatus, I provide opening 94 (see Fig. 3), closed by means of a screw 94¹, as shown. I also provide another opening 95 (see Fig. 2). This latter opening 95 may be closed by means of a valve or stop-cock for hose connection. The screw in opening 94 performs a function not heretofore mentioned.

In the operation of the machine where low temperature prevails, in order to prevent scraper body 24 from freezing to surface 23, an intermittent motion is desired. This is accomplished by screw 94¹, which acts in a double capacity of closing opening 94 and acting as a lug for moving scraper body 24 downward at each stroke of the spraying mechanism, and on the return stroke flange 42 moves in the opposite direction to the point of starting, the movement being very slight, sufficient to prevent a rigid freezing; in the apparatus described the movement is about $\frac{1}{32}$ of an inch.

Referring to Figs. 6 and 16, wherein the electric heater 96 and/or 97 is shown, these heaters, either singly or together, are used to maintain the apparatus in its working parts at a desired temperature. These heaters are controlled singly or together by rheostats and switches, not shown, which are of ordinary construction for electric heating apparatus.

98 (see Figs. 6 and 7) is a discharge tube or pipe for abstracting or exhausting the spraying chamber, wherein is shown (see Fig. 6) the scraping means in inactive position, held up by catch 90, the discharge tube 98 being below the scraper 25, thus permitting the chamber to be exhausted while the scraper is inactive and the spraying is taking place. Discharge tube 98 is attached to the exhaust means not shown for disposing of the gases or vapors drawn therethrough.

The operation of my invention is as follows:

I have described a machine of an improved character for performing the various objects of this invention, and I will now describe the operation of my machine.

First, if it is employed in the production of ice cream and frozen ices, (see Fig. 3) a charge of cream or other mixture with the desired flavoring and other component parts, is placed in charge feed cup 15, when fed by gravity, or it is supplied to pressure pump 18 from tank 17 when the feeding is by pressure. Valve 16, when gravity is employed, and valve 20, when pressure feed is used, are initially closed, and one of said valves (whichever may be used in the feeding) is opened to permit feeding to the machine while the same is operative. The next step is the starting of the main motor 46 by any well-known means for closing the current thereto energizing the same, the means for so doing not being shown. Then lever 59 is depressed, causing intermittent operation; this disengages clutch member 55 from driving gear 51, thus driving shaft 45 which carries the crank 44, and this operates the spraying mechanism to and fro free of the scraping mechanism. The operation of lever 59 also starts the spraying motor 6. Gear 72, operated by pinion 73 on shaft 45, rotates shaft 69 upon which shaft is disc 68 which carries pin 71 and cam 80. As shown, it has been found that a suitable ratio for some purposes is 14 to 1; that is, 13 double strokes would result from the spraying at the end of each spraying cycle, when the spraying motor stops, and the scraping mechanism engages, as previously described, and this makes one double stroke, completing the cycle. This ratio may be changed, as desired, by changing the gear and pinion, or the shift gear mechanism shown in Figs. 15 and 16.

In its rotation pin 71 engages trip lever 64, thus releasing lever 59 to assume its initial position, opening the switch of the spraying motor and stopping the same; the cam 80 on disc 68 operating lever 77, which lever operates trip rod 38, thus operating the clutch mechanism engaging the scraping and spraying mechanism whereby connecting-rod 43 is used for the operation of both mechanisms longitudinally.

Referring particularly to the forms shown in Figs. 15 and 16, wherein is shown a modified form of the operating and timing mechanisms, 82 is a cluster of gears interposed between shaft 49 and gear 51 to increase or decrease the speed of shaft 45, to which crank 44 is attached, with reference to the motor running at constant speed for the purpose of changing the number of strokes per minute of crank 44. Half of the cluster of gears 82 are mounted on a hollow shaft 84 in which is installed a drive-key mechanism 85, by which any one of the pairs of cluster gears 82 is selectively engaged to drive shaft 49. This change of gears may be made while the machine is running, if desired, and is a well-known construction for change of gear operation.

A device 86, similar to gear cluster 82, is located between shaft 45 and intermediate shaft 63, the gears of which are selectively engaged as described for the previous unit 82 in order to change the relative timing between shaft 45 and shaft 69; that is, the relative ratio of operation, thereby changing the cycle of operation of the spraying and the scraping devices.

When ice cream is collected from the chilled surface it is caught in cup 87, which cup is hinged and held in position by a latch which may be detached, dumping said cup.

Having thus described my invention, what I claim and desire to secure by Letters Patent is:

1. In a refrigeration apparatus provided with a spraying device, means for operating the spraying device to spray over a surface adjusted to the operation thereof, a surface to be sprayed, means for scraping said surface of the deposit thereon, means for regulating the temperature of the spraying device, means for regulating the temperature of said scraping device, and means for regulating the temperature of said surface.

2. In a refrigerating apparatus provided with a refrigerating surface to be sprayed, a spraying means for spraying desired substances upon said refrigerating surface to be congealed thereon, a scraping means for scraping substances congealed on said surface therefrom, means for operating said spraying and said scraping means in timed relation with reference to each other.

3. In a refrigerating apparatus provided with a refrigerating surface to be sprayed, a spraying means for spraying desired substances upon said refrigerating surface to be congealed thereon, a scraping means for scraping substances congealed on said surface therefrom, means for operating said spraying and said scraping means in timed relation with reference to each other, and means for changing the relative timing of said operations.

4. In a refrigerating apparatus provided with a refrigerating surface to be sprayed, a spraying means for spraying desired substances upon said refrigerating surface to be congealed thereon, a scraping means for scraping substances congealed on said surface therefrom, means for operating said spraying and said scraping means in timed relation with reference to each other, and means for moving said scraping means during its non-scraping period with reference to said surface to prevent a sticking to said surface.

5. In a refrigeration apparatus provided with a refrigerated surface, a spraying means for spraying said surface and a scraping means for scraping said surface, means for operating said scraping and said spraying means in timed relation and means for relatively regulating the temperature of said spraying and scraping means and said surface to prevent the sticking of contacting parts comprising an electric heating means in proximity to said parts.

6. In a refrigerating apparatus provided with an enclosed refrigerating surface to be sprayed, a spraying means for spraying desired substances upon said refrigerating surface within said enclosure to be congealed thereon, a scraping means within said enclosure for scraping substances congealed on said surface therefrom, means for operating said spraying and said scraping means in timed relation with reference to said surface, and means for exhausting said enclosed chamber embracing said surface to relieve said chamber of any undesirable vapors or gases.

7. In a refrigerating device provided with a spraying and scraping mechanism, means for operating the spraying mechanism relatively continuously with reference to the scraping mechanism, means for operating the scraping mechanism by means of the spraying mechanism at timed intervals, a reservoir into which the scrapings caused by the scraping mechanism are collected, and means for draining said reservoir while said scraping takes place.

JABEZ P. KEMP.